United States Patent [19]

House

[11] 4,007,322
[45] Feb. 8, 1977

[54] ACRYLIC ANAEROBIC SEALANT COMPOSITIONS AND METHOD OF BONDING

[75] Inventor: Jack L. House, Memphis, Tenn.

[73] Assignee: Accrabond Corporation, Cordova, Tenn.

[22] Filed: Oct. 7, 1974

[21] Appl. No.: 512,955

[52] U.S. Cl. .................. 526/292; 260/31.8 R; 260/885; 428/463; 526/320
[51] Int. Cl.$^2$ .................................. C08F 20/20
[58] Field of Search ............ 260/89.5 R, 89.5 A, 260/45.95, 886, 86.1 E, 885, 89.5 H; 526/320, 292

[56] References Cited

UNITED STATES PATENTS

| | | | |
|---|---|---|---|
| 2,628,178 | 2/1953 | Burnett et al. | 260/89.5 A |
| 2,895,950 | 7/1959 | Krieble | 260/89.5 R |
| 3,041,322 | 6/1962 | Krieble | 260/89.5 R |
| 3,043,820 | 7/1962 | Krieble | 260/89.5 R |
| 3,046,262 | 7/1962 | Krieble | 260/89.5 R |
| 3,203,941 | 8/1965 | Krieble | 260/89.5 R |
| 3,218,305 | 11/1965 | Krieble | 260/89.5 A |
| 3,239,477 | 3/1966 | Karo | 260/89.5 A |
| 3,551,311 | 12/1970 | Nass et al. | 260/89.5 R |
| 3,591,438 | 7/1971 | Toback | 260/86.1 R |
| 3,616,040 | 10/1971 | Toback | 260/89.5 A |
| 3,634,379 | 1/1972 | Hauser | 260/89.5 R |
| 3,775,385 | 11/1973 | Ozono et al. | 260/89.5 A |
| 3,880,956 | 4/1975 | Skoultchi | 260/89.5 R |
| 3,904,731 | 9/1975 | Orkin et al. | 260/89.5 R |

OTHER PUBLICATIONS

Hackh's Chemical Dictionary, McGraw-Hill Book Co., N. Y., 1969, p. 527.
Chem. Abstracts, vol. 48, 1964, 13482g.
Chem. Abstracts, vol. 73, 1970, 78091g.
Chem. Abstracts, vol. 64, 1966, 19919b.

Primary Examiner—Harry Wong, Jr.
Attorney, Agent, or Firm—Mason, Kolehmainen, Rathburn & Wyss

[57] ABSTRACT

Anaerobic sealant compositions comprise a monomer having one of the general formulas

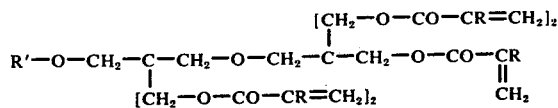

wherein R is hydrogen, halogen, or alkyl containing 1 to 5 carbon atoms and wherein R' is hydrogen, halogen, alkyl containing 1 to 5 carbon atoms, or —CO—CR=CH$_2$; a peroxide or peroxy-ester polymerization catalyst and a polymerization inhibitor for said monomer such as the monomethyl ether of hydroquinone. The compositions can further include a polymerization accelerator, such as benzoic sulfimide, for rapid polymerization and rapid bonding. The compositions are useful for bonding two surfaces and particularly for bonding metallic surfaces such as in bonding a nut to a bolt.

12 Claims, No Drawings

ACRYLIC ANAEROBIC SEALANT COMPOSITIONS AND METHOD OF BONDING

BACKGROUND OF THE INVENTION

A. Field of the Invention

The present invention relates to sealant compositions for bonding surfaces together. More particularly, the present invention relates to anaerobic sealant compositions which polymerize in the absence of oxygen to bond adjacent surfaces together when the surfaces are joined to the exclusion of oxygen. The particular monomers disclosed herein polymerize in the absence of air to deliver virtually full strength at temperatures in the range of about 250°–400° F. and are reactive to practically all metal surfaces.

B. Prior Art

It is known to employ "anaerobic" sealant compositions which polymerize in the absence of oxygen for the purpose of bonding two surfaces together and especially for bonding metal surfaces such as in bonding a nut to a bolt. The anaerobic sealant composition is coated on at least one of the surfaces and when the two surfaces are joined to exclude oxygen therebetween, the monomer of the composition polymerizes and cures to strongly bond the surfaces together. A suitable monomer for the purpose of bonding should have a polymerization rate of less than about 1 hour when oxygen is excluded from the monomer as set forth in the Burnett et al. U.S. Pat. No. 2,628,178. It is therefore conventional to include within an anaerobic sealant composition a polymerization catalyst for the purpose of speeding up the polymerization process of the monomer once oxygen has been excluded.

It is also necessary that the sealant composition be shelf-stable and in this regard it is desirable that the monomer will not polymerize or gell for periods of time as long as 1 year or more. It is therefore common to include within an anaerobic sealant composition a polymerization inhibitor for storage.

The following patents relate to anaerobic sealant compositions containing, in addition to other components, a monomer having the general formula

where R is a member selected from the class consisting of hydrogen, $-CH_3$, $-C_2H_5$, $-CH_2OH$, and $-CH_2-O-CO-CR'=CH_2$ radicals; R' is hydrogen, chlorine, methyl or ethyl; R'' is a member selected from the class consisting of hydrogen, $-OH$ radical, and $-O-CO-CR'=CH_2$ radical; m is an integer equal to at least 1, e.g., from 1 to 3, or higher, for instance, from 1 to 4, inclusive; n is an integer equal to at least 2, for example, from 2 to 20 or more, and p is 0 or 1: Burnett U.S. Pat. No. 2,628,178; Krieble U.S. Pat. No. 2,895,950; Krieble 3,041,322; Krieble U.S. Pat. No. 3,043,820; Krieble U.S. Pat. No. 3,046,262; Krieble U.S. Pat. No. 3,218,305; Krieble U.S. Pat. No. 3,203,941; Gorman et al. U.S. Pat. No. 3,300,547; Nordlander U.S. Pat. No. 3,435,012; Krieble U.S. Pat. No. 3,489,599; Frauenglass U.S. Pat. No. 3,547,851; Toback U.S. Pat. No. 3,591,438; Toback U.S. Pat. No. 3,616,040; Frauenglass U.S. Pat. No. 3,625,875; Toback U.S. Pat. No. 3,625,930; Hauser U.S. Pat. No. 3,634,379; Newmann U.S. Pat. No. 3,672,942.

Another monomer useful in anaerobic sealant compositions is an acrylic ester of an alkylaminoalkyl alcohol, as disclosed in Rai et al. U.S. Pat. No. 3,493,552. Monomeric polyacrylate esters formed by the reaction of a monofunctional, acrylate terminated material with an organic polyisocyanate are disclosed as useful monomers for anaerobic sealant compositions in the Gorman et al. U.S. Pat. No. 3,425,988.

SUMMARY OF THE INVENTION

An object of the present invention is to provide anaerobic sealant compositions stable for long periods of time when in contact with oxygen and which rapidly polymerize in the absence of oxygen.

Another object of the present invention is to provide an adhesive composition able to stand in contact with air for extended periods of time without polymerizing.

Another object of the present invention is to provide anaerobic sealant compositions containing a substantially unoxygenated monomer which does not depend upon the presence of of a hydroperoxide curing catalyst for polymerization in the absence of oxygen.

Another object of the present invention is to provide an anaerobic sealant composition having the characteristic of delivering virtually full strength at temperatures up to about 400° F. when polymerized.

Another object of the present invention is to provide an anaerobic sealant composition containing a monomer or a mixture of monomers exhibiting greater cross-linking when polymerized and therefore greater bonding strength than monomers of prior art anaerobic sealant compositions.

Another object of the present invention is to provide anaerobic sealant compositions containing materials added in an appropriate amount to acheive the desired degree of flexibility and strength.

Another object of the present invention is to provide anaerobic sealant compositions made stronger than prior art anaerobic sealant compositions by the addition of dioctyl phthalate.

Another object of the present invention is to provide anaerobic sealant compositions employing monomers which remain reactive for a period of one year or more but which will not polymerize for one year or more when kept in contact with oxygen.

Another object of the present invention is to provide anaerobic sealant compositions curable on non-metallic surfaces by providing at least one of the surfaces to be bonded with a primer.

Another object of the present invention is to provide anaerobic sealant compositions containing anaerobic monomers having at least 3 sites on each molecule capable of entering into the polymerization reaction.

In brief, the above and other objects and advantages of the present invention are achieved by providing sealant compositions containing one or more acrylic monomers having at least three ester linkages and at least three terminal $CH_2=C<$ groupings, a polymerization catalyst and a polymerization inhibitor. The polymerization catalyst is included for the purpose of providing the composition with a suitable polymerization rate in the absence of oxygen. The polymerization inhibitor is included so that the composition will have a suitably long shelf life while the composition is in contact with oxygen. If desired, one or more accelerators can be included to reduce the time required for polymerization.

Other materials may be added, if desired, to provide the composition with flexibility, strength, fluorescence and a faster rate of polymerization.

The monomer or mixture of monomers useful in the present invention are commerically available and generally prepared from a tetrafunctional or higher functional alcohol, including pentaerythritol and dipentaerythritol, and have one of the following general formulas:

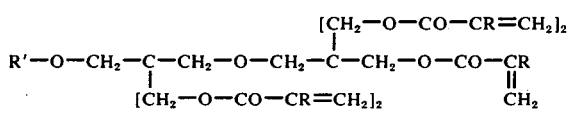

wherein R is hydrogen, halogen, or alkyl containing 1 to 5 carbon atoms and wherein R' is hydrogen, halogen, alkyl containing 1 to 5 carbon atoms, or —CO—CR = CH$_2$.

The composition must include a polymerization catalyst. An organic peroxide or a peroxy-ester in an amount of about 0.1%-15% by weight of the total composition is sufficient to obtain the desired degree of polymerization once oxygen has been excluded from the anaerobic sealant composition. Some of the typical peroxides and peroxy-ester catalysts are as follows: tertiary-butyl peracetate, tertiary-butyl permaleate, benzoyl peroxide, tertiary butyl perbenzoate, tertiary-butyl perisobutyrate, tertiary-amyl perbenzoate, tertiary-butyl perbenzoate, tertiary-butyl 3,3,5-trimethyl perhexanoate, and ditertiarybutyl diperphthalate. The preferred catalyst is ditertiarybutyl diperphthalate. It is preferred to use the catalyst in an amount in the range of about 0.5 to 7.5% based on the weight of the total composition.

An important feature of the present invention is that conventional peroxidic and peroxy-ester polymerization catalysts including tertiary-butyl perbenzoate, ditertiary-butyl diperphthalate, and benzoylperoxide can polymerize the monomers of the compositions of the present invention within a maximum time period of about 6 hours upon the exclusion of oxygen. As set forth in the Krieble U.S. Pat. No. 2,895,950, conventional peroxidic polymerization catalysts are ineffective in providing a useful degree of anaerobic curing to the unoxygenated acrylate monomers disclosed in that Krieble patent. It was quite surprising that the peroxide and peroxy-ester curing catalysts set forth above were able to provide a useful degree of anaerobic curing to the unoxygenated acrylate monomers of the compositions set forth herein in less than 6 hours, and generally within an hour. The hydroperoxide curing catalysts set forth in the Krieble U.S. Pat. No. 2,895,950 are therefore unnecessary to achieve a useful degree of anaerobic curing of the anaerobic sealant compositions set forth herein.

Whenever rapid curing of the anaerobic sealant composition is required it is desirable to include a curing accelerator within the sealant composition. Without a curing accelerator, the polymerization or curing of the sealant composition may take 12 to 24 hours or more. For certain applications such cure times may be acceptable, but generally it is desirable that the sealant composition cure within a period of less than 6 hours, preferably less than 1 hour. The accelerator can be added in an amount in the range of about .01% to 15% by weight of the total composition, preferably 0.1% to 5% by weight.

The accelerators found most useful in accelerating the polymerization rate of the monomers of the compositions of the present invention without greatly affecting the shelf life are secondary and tertiary amines and organic sulfimides having the general formula

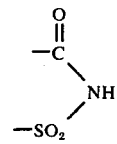

of the sulfimides, benzoic sulfimide is most useful in accelerating the polymerization rate of the sealant compositions described herein while also providing good shelf stability. The preferred secondary and teriary amine accelerators are diethyl amine; triethyl amine; and N-N-dimethyl-p-toluidine. Of these amines, triethyl amine is most effective in terms of greatest acceleration while providing good shelf stability. Mixtures of one or more secondary and/or teriary amines with one or more sulfimides have been found more effective than the addition of each component alone.

The anaerobic sealant compositions of the present invention must also include a polymerization inhibitor or stabilizer in an amount in the range of about 10 ppm to 25,000 ppm, based on the total weight of the composition, to provide shelf stability. It has been found that hydroquinone and the monomethyl ether of hydroquinone sufficiently inhibit the polymerization of the unoxygenated monomers disclosed herein so that a shelf life of one year or more is achieved so long as the composition remains in contact with oxygen. It is preferred to add the inhibitor in an amount in the range of about 2,000 ppm to 10,000 ppm based on the total weight of the composition.

The compositions disclosed herein are reactive to all metallic surfaces including aluminum, zinc, cadmium, steel, stainless steel, platinum, chromium, tin, iron, copper, and various alloys of these metals such as brass, bronze and the like. Polymerization will therefore always be initiated when at least one of the surfaces bonded is metal. However, when neither of the bonded surfaces are metal, at least one of the surfaces must be pre-treated with a "primer" or "surface activator" for the purpose of initiating polymerization of the anaerobic sealant composition.

Primers effective for initiating polymerization of the anaerobic sealant compositions described herein generally fall into three categories (1) certain amine compounds and particularly aldehyde-amine condensation products, (2) sulfur containing free radical compounds, and (3) compounds containing an oxidizable transition metal. These compounds are fully disclosed in the Newmann U.S. Pat. No. 3,672,942, at columns 8-11, which disclosure is herein incorporated by reference. Other useful primers are disclosed in the Toback et al. U.S. Pat. No. 3,625,930.

The amine compounds found most useful as primers for the sealant compositions of the present invention are ethylenediamine, phenylethylethanol amine, the reaction product of butyraldehyde and butylamine, aryl amines such as dimethyl-p-toluidine, and dimethylaniline. Sulfur compounds found most useful as primers for the compositions disclosed herein are mercaptobenzothiazole (MBT), thiocarbanilide and mercaptoethyltriethoxysilane. Of the oxidizable transition metal compounds, iron octoate, cobalt octoate, and copper naphthanate have been found most useful as primers for the compositions disclosed herein. These primers or surface activators are combined with a solvent such as trichloroethylene and coated on the surface in any convenient manner as by spraying the surface with the primer formulation. The following primer formulations were prepared and found to sufficiently initiate polymerization when joining non-metallic surfaces with the compositions of the present invention.

PRIMER 1:
 65% Trichloroethylene (TCE)
 0.01% Copper naphthanate
 5% Iron Octoate
 3% Benzoic sulfimide
 2% Dimethyl aniline
 25% Methyl alcohol PRIMER 2:
 75% TCE
 10% Hexamethylenediamine
 10% Iron Octoate
 5% Copper naphthanate PRIMER 3:
 99.9% TCE
 0.1% Mercaptobenzothiazole (MBT)

PRIMER 4:
 98% TCE
 2% Ethylene diamine

PRIMER 5:
 99% TCE
 0.66% Copper naphthanate
 0.34% Dimethyl-p-toluidine

PRIMER 6:
 77% TCE
 20% Ethanol
 2% MBT
 1% Thiocarbanilide

PRIMER 7:
 84.4% TCE
 12.99% Ethanol
 1% MBT
 1.5 Reaction product of butyraldehyde and butyl amine PRIMER 8:
 99% TCE
 1% Phenylethylethanol amine PRIMER 9:
 99% TCE
 1% Mercaptoethyltriethoxysilane Other materials can be added to the anaerobic sealant compositions of the present invention such as additional monomers, initiators and accelerators, adhesive agents, viscosity and adhesion modifiers, plasticizers, strength modifiers, coloring agents such as fluorescent brighteners, and the like. These materials are generally added to provide a desired functional characteristic to the sealant compositions to make them suitable for a particular use.

A viscosity modifier can be added to the sealant compositions of the present invention so that the compositions will adequately coat the surfaces to be bonded. When only a very narrow gap is provided between surfaces to be joined, such as with a finely threaded bolt, the sealant composition should be relatively thin so that the composition will penetrate the gap and sufficiently coat the surfaces to be joined. When the gap distance is relatively wide, the sealant composition should be relatively viscous so that the composition will adequately coat the surfaces during the curing of the monomers. Some of the materials found to be effective for varying the viscosity of the compositions of the present invention include thermoplastic polymers and co-polymers of acrylic and methacrylic esters, acrylic polymers such as polymethyl methacrylate, and polymers of diallyl phthalate. These viscosity modifiers can be added in amounts in the range of about .01% to 10% by weight of the total composition, preferably in the range of about 0.1% to 5% by weight. The above viscosity modifiers also tend to vary the strength of the polymerized sealant compositions.

Other materials can be added for the purpose of varying the strength or adhesion and the flexibility of the polymerized sealant compositions of the present invention. These materials also tend to vary the viscosity of the sealant compositions. It is sometimes desirable to decrease the strength of the anaerobic sealant compostition so that it is easier to later separate the surfaces which have been bonded by the composition. For example, sometimes it is desirable to remove a nut which has been sealed to a bolt. By decreasing the strength of the sealant, the nut can be removed from the bolt, after the composition has cured, without causing damage to either nut or bolt. The addition of esters such as dibutyl maleate, dibutyl fumarate, dimethyl itaconate, di-2-ethylhexyl azeleate, di-n-hexyl azeleate, tetrahydrofurfuryl oleate, triethylene glycol dipelargonate, and diethylene glycol dipelargonate tend to weaken the polymerized sealant compositions of the present invention and make them more flexible. The addition of dioctyl phthalate strengthens the polymerized sealant composition. Dimers, trimers, and higher polymers of these esters can also be added to vary the strength of the polymerized sealant compositions. It has also been found that the addition of styrene-maleic anhydride prepolymers will increase the adhesion and flexibility of the polymerized materials to a noticeable degree. These strength modifying materials are added in an amount sufficient to achieve the desired strength modification and can be added in amounts up to about 50% by weight of the total composition.

It may also be desirable to add a coloring agent such as a soluble dye or a brightening agent to the composition for the purpose of product identification and quality control. Fluorescent fabric brighteners known in the textile art serve this purpose. One particular fluorescent brightener, (4,4'-distearyl diphenyl 2,2'disulfonate) has been found to unexpectedly increase the shelf life of the anaerobic sealant compositions of the present invention.

The stability of the sealant compositions of the present invention can be tested by placing a sample of the composition in a test tube and suspending it in a constant temperature bath maintained at about 82° C. A sample which is free from gelling after 30 minutes at 82° C. will have a minimum gel-free shelf life of one year.

The reactivity of the sealant compositions of the present invention can be tested by placing a sample of the composition in a constant temperature oven maintained at about 49° C. for a period of 21 days. If there is no significant change in reaction speed (polymerization rate) of the composition, when taken from the oven after 21 days, it will remain reactive during a shelf storage period of one year.

EXAMPLES

In examples 1–20, sealant compositions are prepared to fit a particular use. In each example various additives are included to vary the strength, viscosity, flexibility or adhesion characteristics of the sealant composition. The materials are combined by adding to a glass beaker and mixing with a glass stirring rod.

EXAMPLE 1

Screw Lock Sealant Composition

Pentaerythritol triacrylate monomer is added to a glass beaker in an amount of 560.4 grams followed by the addition, with stirring, of 19.6 grams of polymethyl methacrylate, 390 grams of dibutyl maleate, 5 grams of benzoic sulfimide, 5 grams of triethylamine, 0.025 grams of the monomethyl ether of hydroquinone, and 20 grams of di-tertiary-butyl diperphthalate. This composition is excellent for securing screws in place and is summarized below where percentages are by weight of total composition:

| | |
|---|---|
| pentaerythritol triacrylate | 56.04% |
| polymethyl methacrylate | 1.96% |
| dibutyl maleate | 39% |
| benzoic sulfimide | 0.5% |
| triethylamine | 0.5% |
| monomethyl ether of hydroquinone | 2500 ppm |
| di-t-butyl diperphthalate | 2% |

In examples 2–20 the ingredients of each composition were mixed in accordance with the procedure of Example 1. Each composition is summarized by providing the percentage by weight of each material in the composition.

EXAMPLE 2

Screw Lock Sealant Composition

| Screw Lock Sealant Composition | |
|---|---|
| pentaerythritol triacrylate | 56.04% |
| polymethyl methacrylate | 1.96% |
| dibutyl maleate | 39% |
| benzoic sulfimide | 0.5% |
| monomethyl ether of hydroquinone | 2500 ppm |
| di-t-butyl diperphthalate | 2% |

EXAMPLE 3

Nut Lock Sealant Composition

| Nut Lock Sealant Composition | |
|---|---|
| pentaerythritol | 44.75% |
| triethylene glycol dimethacrylate | 10.58% |
| diethylene glycol dimethacrylate | 10.58% |
| polymethyl methacrylate | 3.2% |
| dibutyl maleate | 28.64% |
| benzoic sulfimide | 0.25% |
| triethylamine | 0.5% |
| monomethyl ether of hydroquinone | 2500 ppm |
| di-t-butyl diperphthalate | 1.5% |

EXAMPLE 4

Nut Lock Sealant Composition

| Nut Lock Sealant Composition | |
|---|---|
| pentaerythritol triacrylate | 44.85% |
| triethylene glycol dimethacrylate | 10.68% |
| diethylene glycol dimethacrylate | 10.68% |
| polymethyl methacrylate | 3.2% |
| dibutyl maleate | 28.84% |
| benzoic sulfimide | 0.25% |
| monomethyl ether of hydroquinone | 2500 ppm |
| di-t-butyl diperphthalate | 1.5% |

EXAMPLE 5

Stud Lock Sealant Composition

| Stud Lock Sealant Composition | |
|---|---|
| pentaerythritol tetraacrylate | 43.58% |
| triethylene glycol dimethacrylate | 20.58% |
| diethylene glycol dimethacrylate | 20.58% |
| polymethyl methacrylate | 6.9% |
| dioctyl phthalate | 6.11% |
| benzoic sulfimide | 0.25% |
| triethylamine | 0.5% |
| monomethyl ether of hydroquinone | 2500 ppm |
| di-t-butyl diperphthalate | 1.5% |

EXAMPLE 6

Stud Lock Sealant Composition

| Stud Lock Sealant Composition | |
|---|---|
| pentaerythritol triacrylate | 43.78% |
| triethylene glycol dimethacrylate | 20.73% |
| diethylene glycol dimethacrylate | 20.73% |
| polymethyl methacrylate | 6.9% |
| dioctyl phthalate | 6.11% |
| benzoic sulfimide | 0.25% |
| monomethyl ether of hydroquinone | 2500 ppm |
| di-t-butyl diperphthalate | 1.5% |

EXAMPLE 7

Large Stud Lock Sealant Composition

| Large Stud Lock Sealant Composition | |
|---|---|
| pentaerythritol triacrylate | 43.44% |
| triethylene glycol dimethacrylate | 20.28% |
| diethylene glycol dimethacrylate | 20.28% |
| polymethyl methacrylate | 8.13% |
| dioctyl phthalate | 6.11% |
| benzoic sulfimide | 0.25% |
| monomethyl ether of hydroquinone | 2500 ppm |
| di-t-butyl diperphthalate | 1.5% |

EXAMPLE 8

Rataining Composition

| Rataining Composition | |
|---|---|
| pentaerythritol tetramethacrylate | 43.11% |
| triethylene glycol dimethacrylate | 19.85% |
| diethylene glycol dimethacrylate | 19.85% |
| polymethyl methacrylate | 2.67% |
| styrene-maleic anhydride prepolymer | 2.58% |
| diallyl phthalate polymer | 3.09% |
| dioctyl phthalate | 6.6% |

EXAMPLE 8-continued

| Rataining Composition | |
|---|---|
| benzoic sulfimide | 0.25% |
| triethylamine | 0.5% |
| di-t-butyl diperphthalate | 1.5% |

EXAMPLE 9

Retaining Composition

| Retaining Composition | |
|---|---|
| pentaerythritol triacrylate | 43.31% |
| triethylene glycol dimethacrylate | 20.0% |
| diethylene glycol dimethacrylate | 20.0% |
| polymethyl methacrylate | 2.67% |
| styrene-maleic anhydride prepolymer | 2.58% |
| diallyl phthalate polymer | 3.09% |
| dioctyl phthalate | 6.6% |
| benzoic sulfimide | 0.25% |
| monomethyl ether of hydroquinone | 2500 ppm |
| di-t-butyl diperphthalate | 1.5% |

EXAMPLE 10

Bearing Mount Sealant Composition

| Bearing Mount Sealant Composition | |
|---|---|
| pentaerythritol triacrylate | 45.45% |
| triethylene glycol dimethacrylate | 20.38% |
| diethylene glycol dimethacrylate | 20.38% |
| polymethyl methacrylate (1500 cps at 25° C measured at 35% solids in MEK) | 4.56% |
| dioctyl phthalate | 6.98% |
| benzoic sulfimide | 0.25% |
| triethylamine 0.5% | |
| monomethyl ether of hydroquinone | 2500 ppm |
| di-t-butyl diperphthalate | 1.5% |

EXAMPLE 11

Bearing Mount Sealant Composition

| Bearing Mount Sealant Composition | |
|---|---|
| pertaerythritol triacrylate | 45.64% |
| triethylene glycol dimethacrylate | 20.53% |
| diethylene glycol dimethacrylate | 20.53% |
| polymethyl methacrylate (1200 cps at 250° C measured at 35% solids in MEK) | 4.56% |
| dioctyl phthalate | 6.98% |
| benzoic sulfimide | 0.25% |
| monomethyl ether of hydroquinone | 2500 ppm |
| di-t-butyl diperphthalate | 1.5% |

EXAMPLE 12

Hydraulic/Oil Sealant Composition

| Hydraulic/Oil Sealant Composition | |
|---|---|
| pentaerythritol trimethacrylate | 54.2% |
| polymethyl methacrylate | 3.47% |
| dibutyl maleate | 39.33% |
| benzoic sulfimide | 0.5% |
| triethylamine | 0.5% |
| monomethyl ether of hydroquinone | 2500 ppm |
| di-t-butyl diperphthalate | 2% |

EXAMPLE 13

Hydraulic/Oil Sealant Composition

| Hydraulic/Oil Sealant Composition | |
|---|---|
| pentaerythritol triacrylate | 54.7% |
| polymethyl methacrylate | 3.47% |
| dibutyl maleate | 39.33% |
| benzoic sulfimide | 0.5% |
| monomethylether of hydroquinone | 2500 ppm |
| di-t-butyl diperphthalate | 2% |

EXAMPLE 14

Pipe Sealant Composition

| Pipe Sealant Composition | |
|---|---|
| pentaerythritol triacrylate | 54.24% |
| polymethyl methacrylate | 5.54% |
| dibutyl maleate | 37.22% |
| benzoic sulfimide | 0.5% |
| triethylamine | 0.5% |
| monomethyl ether of hydroquinone | 2500 ppm |
| di-t-butyl diperphthalate | 2% |

EXAMPLE 15

Pipe Joint Sealant Composition

| Pipe Joint Sealant Composition | |
|---|---|
| pentaerythritol triacrylate | 54.74% |
| polymethyl methacrylate | 5.54% |
| dibutyl maleate | 37.22% |
| benzoic sulfimide | 0.5% |
| monomethyl ether of hydroquinone | 2500 ppm |
| di-t-butyl diperphthalate | 2% |

EXAMPLE 16

Gasket Sealant Composition

| Gasket Sealant Composition | |
|---|---|
| pentaerythritol triacrylate | 42.49% |
| diethylene glycol dimethacrylate | 40.26% |
| polymethyl methacrylate | 9.39% |
| dioctyl phthalate | 6.11% |
| benzoic sulfimide | 0.25% |
| monomethyl ether of hydroquinone | 2500 ppm |
| di-t-butyl diperphthalate | 1.5% |

EXAMPLE 17

Plastic Gasket Sealant Composition

| Plastic Gasket Sealant Composition | |
|---|---|
| pentaerythritol tetramethacrylate | 42.29% |
| triethylene glycol dimethacrylate | 19.98% |
| diethylene glycol dimethacrylate | 19.98% |
| polymethyl methacrylate | 9.39% |
| dioctyl phthalate | 6.11% |
| benzoic sulfimide | 0.25% |
| triethylamine | 0.5% |
| monomethyl ether of hydroquinone | 2500 ppm |
| di-t-butyl diperphthalate | 1.5% |

EXAMPLE 18

Casting Sealant Composition

| Casting Sealant Composition | |
|---|---|
| pentaerythritol triacrylate | 56.59% |
| triethylene glycol dimethacrylate | 20.58% |
| diethylene glcyol dimethacrylate | 20.58% |
| benzoic sulfimide | 0.25% |
| triethylamine | 0.5% |
| monomethyl ether of hydroquinone | 2500 ppm |
| di-t-butyl diperphthalate | 1.5% |

EXAMPLE 19

Wicking Composition

| Wicking Composition | |
|---|---|
| pentaerythritol triacrylate | 56.79% |
| triethylene glycol dimethacrylate | 20.73% |
| diethylene glycol dimethacrylate | 20.73% |
| benzoic sulfimide | 0.25% |
| monomethyl ether of hydroquinone | 2500 ppm |
| di-t-butyl diperphthalate | 1.5% |

EXAMPLE 20

Refrigerant Sealant Composition

| Refrigerant Sealant Composition | |
|---|---|
| pentaerythritol triacrylate | 43.25% |
| triethylene glycol dimethacrylate | 20.13% |
| diethylene glycol dimethacrylate | 20.13% |
| polymethyl methacrylate | 8.13% |
| dioctyl phthalate | 6.11% |
| benzoic sulfimide | 0.25% |
| triethylamine | 0.5% |
| monomethyl ether of hydroquinone | 2500 ppm |
| di-t-butyl diperphthalate | 1.5% |

The materials of Examples 21–29 were mixed in the same manner as in Example 1. The compositions are set forth in percent by weight.

EXAMPLE 21

| | |
|---|---|
| pentaerythritol triacrylate | 56.24% |
| polymethyl methacrylate | 1.96% |
| dibutyl maleate | 38.8% |
| benzoic sulfimide | 0.5% |
| triethylamine | 0.5% |
| monomethyl ether of hydroquinone | 2500 ppm |
| di-t-butyl diperphthalate | 2% |

EXAMPLE 22

| | |
|---|---|
| pentaerythritol triacrylate | 44.65% |
| triethylene glycol dimethacrylate | 10.53% |
| diethylene glycol dimethacrylate | 10.53% |
| polymethyl methacrylate | 3.2% |
| dibutyl maleate | 28.84% |
| benzoic sulfimide | 0.25% |
| triethylamine | 0.5% |
| monomethyl ether of hydroquinone | 2500 ppm |
| di-t-butyl diperphthalate | 1.5% |

EXAMPLE 23

| | |
|---|---|
| pentaerythritol triacrylate | 43.58% |
| triethylene glycol dimethacrylate | 20.58% |
| diethylene glycol dimethacrylate | 20.58% |
| polymethyl methacrylate | 6.9% |
| dioctyl phthalate | 6.11% |
| benzoic sulfimide | 0.25% |
| triethylamine | 0.5% |
| monomethyl ether of hydroquinone | 2500 ppm |
| di-t-butyl diperphthalate | 1.5% |

EXAMPLE 24

| | |
|---|---|
| pentaerythritol triacrylate | 43.11% |
| triethylene glycol dimethacrylate | 19.85% |
| diethylene glycol dimethacrylate | 19.85% |
| polymethyl methacrylate | 2.67% |
| styrene-maleic anhydride prepolymer | 2.58% |
| dialkyl phthalate polymer | 3.09% |
| dioctyl phthalate | 6.6% |
| benzoic sulfimide | 0.25% |
| triethylamine | 0.5% |
| monomethyl ether of hydroquinone | 2500 ppm |
| di-t-butyl diperphthalate | 1.5% |

EXAMPLE 25

| | |
|---|---|
| pentaerythritol triacrylate | 45.44% |
| triethylene glycol dimethacrylate | 20.38% |
| diethylene glycol dimethacrylate | 20.38% |
| dioctyl phthalate | 6.98% |
| polymethyl methacrylate (1900 cps at 25° C measured at 35% solids in MEK) | 4.57% |
| benzoic sulfimide | 0.25% |
| triethylamine | 0.5% |
| monomethyl ether of hydroquinone | 2500 ppm |
| di-t-butyl diperphthalate | 1.5% |

EXAMPLE 26

| | |
|---|---|
| pentaerythritol triacrylate | 54.44% |
| polymethyl methacrylate | 5.54% |
| dibutyl maleate | 37.02% |
| benzoic sulfimide | 0.5% |
| triethylamine | 0.5% |
| monomethyl ether of hydroquinone | 2500 ppm |
| di-t-butyl diperphthalate | 2% |

EXAMPLE 27

| | |
|---|---|
| pentaerythritol triacrylate | 43.24% |
| triethylene glycol dimethacrylate | 20.13% |
| diethylene glycol dimethacrylate | 20.13% |
| polymethyl methacrylate | 8.14% |
| dioctyl phthalate | 6.11% |
| benzoic sulfimide | 0.25% |
| triethylamine | 0.5% |
| monomethyl ether of hydroquinone | 2500 ppm |
| di-t-butyl diperphthalate | 1.5% |

EXAMPLE 28

| | |
|---|---|
| pentaerythritol triacrylate | 42.19% |
| triethylene glycol dimethacrylate | 20.03% |
| diethylene glycol dimethacrylate | 20.03% |
| polymethyl methacrylate | 4.92% |

EXAMPLE 28-continued

| | |
|---|---|
| dioctyl phthalate | 6.11% |
| benzoic sulfimide | 0.25% |
| triethylamine | 0.5% |
| monomethyl ether of hydroquinone | 2500 ppm |
| di-t-butyl diperphthalate | 1.5% |

EXAMPLE 29

| | |
|---|---|
| pentaerythritol triacrylate | 56.59% |
| triethylene glycol dimethacrylate | 20.58% |
| diethylene glycol dimethacrylate | 20.58% |
| benzoic sulfimide | 0.25% |
| triethylamine | 0.5% |
| monomethyl ether of hydroquinone | 2500 ppm |
| di-t-butyl diperphthalate | 1.5% | cure for 24 hours and then placed in an oven preheated to 300° F. and allowed to remain for 30 minutes to reach 300° F. throughout the material. The samples were removed and tested by placing the head of the screw in a fixture and using a calibrated torque wrench to remove the nut (See Table I). Nine additional samples were prepared in the same manner and allowed to cure for 24 hours, placed in a 300° F. oven and taken out and tested at 500-hour intervals up to 2,000 hours (See Table I). Nine additional samples were prepared as above from brass, bronze, aluminum, cadmium-plated, zinc-plated and stainless steel fasteners. These samples were tested in the above described manner for 24-hour torque values. (See Table II). Samples 21–29 of Tables I and II refer to the compositions of Examples 21–29.

TABLE I

Compositions of Examples 21–29: Breakaway Torque Inch.-Lbs./Prevailing Torque Inch.-Lbs.

| Sample No. | Room Temp. | 300° F. Hot | 300° F. Cool 500 hr | 300° F. Hot 500 hr | 300° F. Cool 1000 hr | 300° F. Hot 1000 hr | 300° F. Cool 2000 hr | 300° F. Hot 2000 hr | 300° F. Cool 4000 hr | 300° F. Hot 4000 hr |
|---|---|---|---|---|---|---|---|---|---|---|
| 21 | 75/35 | 70/40 | 75/35 | 70/30 | 70/45 | 75/35 | 75/45 | 75/40 | 75/50 | 65/35 |
| 22 | 125/75 | 125/70 | 150/100 | 150/90 | 125/75 | 140/85 | 125/60 | 140/90 | 125/80 | 135/85 |
| 23 | 240/325 | 230/320 | 250/375 | 240/340 | 245/340 | 240/330 | 225/300 | 235/300 | 235/325 | 230/300 |
| 24 | 250/400 | 250/380 | 260/400 | 240/390 | 240/385 | 235/395 | 250/390 | 225/380 | 240/400 | 220/375 |
| 25 | 225/300 | 220/310 | 230/325 | 220/300 | 230/315 | 215/300 | 220/300 | 210/310 | 235/300 | 210/300 |
| 26 | 45/25 | 45/20 | 60/30 | 50/25 | 40/25 | 50/30 | 45/35 | 45/30 | 40/20 | 40/30 |
| 27 | 240/340 | 225/325 | 250/340 | 230/340 | 235/320 | 225/340 | 240/330 | 220/335 | 235/320 | 225/330 |
| 28 | 250/325 | 240/320 | 265/340 | 240/330 | 240/330 | 225/310 | 250/310 | 225/300 | 240/330 | 230/310 |
| 29 | 175/400 | 180/390 | 200/420 | 180/390 | 175/375 | 175/380 | 180/385 | 170/450 | 175/390 | 170/390 |

TABLE II

Compositions of Examples 21–29: Breakaway Torque Inch.-Lbs./Prevailing Torque Inch.-Lbs.

| Sample | Bronze | Cadmium | Zinc | Aluminum | Stain. Steel |
|---|---|---|---|---|---|
| 21 | 65/30 | 65/35 | 65/30 | 50/30 | 40/25 |
| 22 | 110/65 | 125/70 | 120/65 | 110/50 | 90/30 |
| 23 | 150/225 | 105/300 | 140/225 | 100/275 | 75/150 |
| 24 | 150/225 | 165/275 | 140/225 | 100/250 | 75/150 |
| 25 | 110/225 | 125/300 | 110/260 | 90/250 | 65/125 |
| 26 | 40/25 | 40/30 | 45/30 | 45/25 | 35/20 |
| 27 | 150/225 | 160/280 | 145/230 | 100/260 | 75/160 |
| 28 | 140/230 | 145/265 | 140/225 | 110/240 | 65/150 |
| 29 | 90/225 | 100/300 | 75/275 | 50/260 | 60/160 |

Each of the compositions of Examples 21–29 were tested in the following manner: a degreased medium carbon steel nut was screwed down close to the head of a threaded, degreased ⅜-24, 1-inch medium carbon steel cap screw after the threads of nine separate cap screws were coated with the sealant compositions of Examples 21–29 and the nut was backed up to be positioned in the area covered by the sealant. Each nut was checked periodically to determine when it could no longer be moved on the screw by hand. This initial cure to "finger-tight" occurs when the composition has cured to the extent that 5 to 7 inch pounds of torque is necessary to remove the nut. Nine additional cap screw and nut assemblies were prepared in the same manner and left to stand for 24 hours. They were than checked for maximum locking torque by placing the head of the screw in a fixture and removing the nut with a calibrated torque wrench (See Table I). Nine other samples were prepared in the same manner and allowed to It is an important feature of the present invention that the sealant compositions described herein do not lose strength at high temperatures. As set forth in Table I, the compositions of the present invention provide about the same high strength at elevated temperatures as they provide at room temperature. This fact is quite surprising since prior art sealant compositions containing acrylate monomers lose much of their strength at temperatures in the range of 300° F. or higher.

In addition to the uses set forth in Examples 1–20, the compositions of the present invention can be used for such purposes as water-resistant and heat-resistant sealants, leak sealants, filling cracks in porcelain, permanently bonding substantially all threaded connections and set screws, bonding glass, attaching rotors to shafts, and cementing metal laminations. In each application the sealant compositions described herein will cure at room temperature. Only very small amounts of the above described sealant compositions are necessary to bond mating surfaces. For example, only a few drops is necessary to bond a nut to a ⅜-24 bolt. The surfaces bonded should be clean and free from contamination prior to applying the composition.

I claim:

1. In an anaerobic sealant composition having extended shelf life in the presence of oxygen and capable of rapid polymerization when oxygen is excluded therefrom including a monomer, a polymerization catalyst for the monomer, selected from the group consisting of peroxy and peroxy-ester compounds, and a polymerization inhibitor for the monomer, the improvement comprising a monomer having the general formula $$[CH_2\!=\!CR\!-\!COO\!-\!H_2C]_3\!-\!C\!-\!CH_2OR'$$

or $$R'\!-\!O\!-\!CH_2\!-\!\underset{\underset{[CH_2\!-\!O\!-\!CO\!-\!CR\!=\!CH_2]_2}{|}}{\overset{\overset{[CH_2\!-\!O\!-\!CO\!-\!CR\!=\!CH_2]_2}{|}}{C}}\!-\!CH_2\!-\!O\!-\!CH_2\!-\!\underset{\underset{CH_2}{\|}}{\overset{\overset{CR}{}}{C}}\!-\!CH_2\!-\!O\!-\!CO\!-\!CR$$

wherein R is hydrogen, halogen, or alkyl containing 1 to 5 carbon atoms and wherein R' is hydrogen, halogen, alkyl containing 1 to 5 carbon atoms, or $-CO-CR\!=\!CH_2$.

2. A composition as defined by claim 1 wherein the monomer has the general formula $$[CH_2\!=\!CR\!-\!CO\!-\!O\!-\!H_2C]_3\!-\!C\!-\!CH_2OR'$$

wherein each R, the same or different, is hydrogen, halogen, or alkyl containing 1 to 5 carbon atoms and wherein R' is hydrogen, halogen, alkyl containing 1 to 5 carbon atoms, or $$-CO-CR\!=\!CH_2.$$

3. A composition as defined by claim 1 wherein the monomer has the general formula $$R'\!-\!O\!-\!CH_2\!-\!\underset{\underset{[CH_2\!-\!O\!-\!CO\!-\!CR\!=\!CH_2]_2}{|}}{\overset{\overset{[CH_2\!-\!O\!-\!CO\!-\!CR\!=\!CH_2]_2}{|}}{C}}\!-\!CH_2\!-\!O\!-\!CH_2\!-\!C\!-\!CH_2\!-\!O\!-\!CO\!-\!CR\!=\!CH_2$$

wherein each R, the same or different, is hydrogen, halogen, or alkyl containing 1 to 5 carbon atoms and wherein R' is hydrogen, halogen, alkyl containing 1 to 5 carbon atoms, or $$-CO-CR\!=\!CH_2.$$

4. A composition as defined by claim 1 which further includes a curing accelerator for decreasing the time necessary to cure said monomer when said monomer is not in contact with oxygen.

5. A composition as defined by claim 4 wherein the curing accelerator is an organic sulfimide having the formula

or a secondary or tertiary amine.

6. A composition as defined by claim 5 wherein the curing accelerator is a tertiary amine selected from the group consisting of triethylamine, and dimethyl-para-toluidine.

7. A composition as defined by claim 1 wherein said catalyst is present in an amount in the range of about 0.1–15% by weight of the total composition.

8. A composition as defined by claim 1 wherein the polymerization inhibitor is hydroquinone or the monomethyl ether of hydroquinone and wherein said inhibitor is present in an amount of about 10 ppm–25,000 ppm based on the weight of the composition.

9. A composition as defined by claim 1 wherein the polymerization inhibitor is a mixture of hydroquinone and the monomethyl ether of hydroquinone.

10. A composition as defined by claim 4 wherein the accelerator is a mixture of an organic sulfimide and a tertiary amine.

11. A composition as defined by claim 1 wherein said monomer is pentaerythritol triacrylate, said polymerization catalyst is di-t-butyl diperphthalate, and said polymerization inhibitor is the monomethyl ether of hydroquinone.

12. A composition as defined by claim 11 wherein said catalyst is included in an amount in the range of about 0.1 to 15%, and said inhibitor is included in an amount of between 10 ppm and 25,000 ppm.